Nov. 16, 1971   J. C. SCHINDLER ET AL   3,620,156
BUN TOASTER
Filed Nov. 3, 1969   5 Sheets-Sheet 1
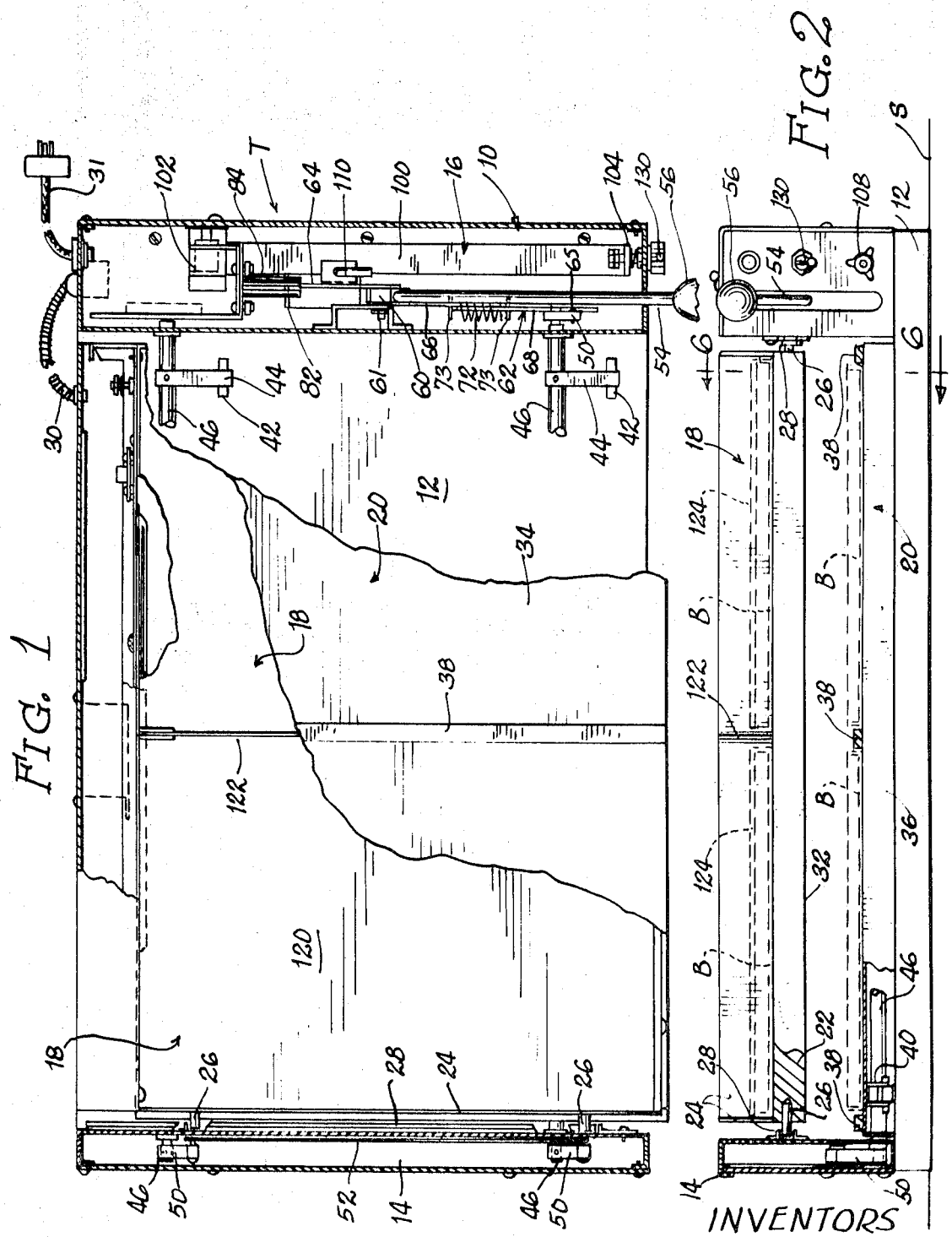
INVENTORS
James C. Schindler
Ralph E. Weimer
Ronald M. Herbert
By Dressler, Goldsmith, Clement & Gordon Att'ys Nov. 16, 1971    J. C. SCHINDLER ET AL    3,620,156

BUN TOASTER

Filed Nov. 5, 1969    5 Sheets-Sheet 2

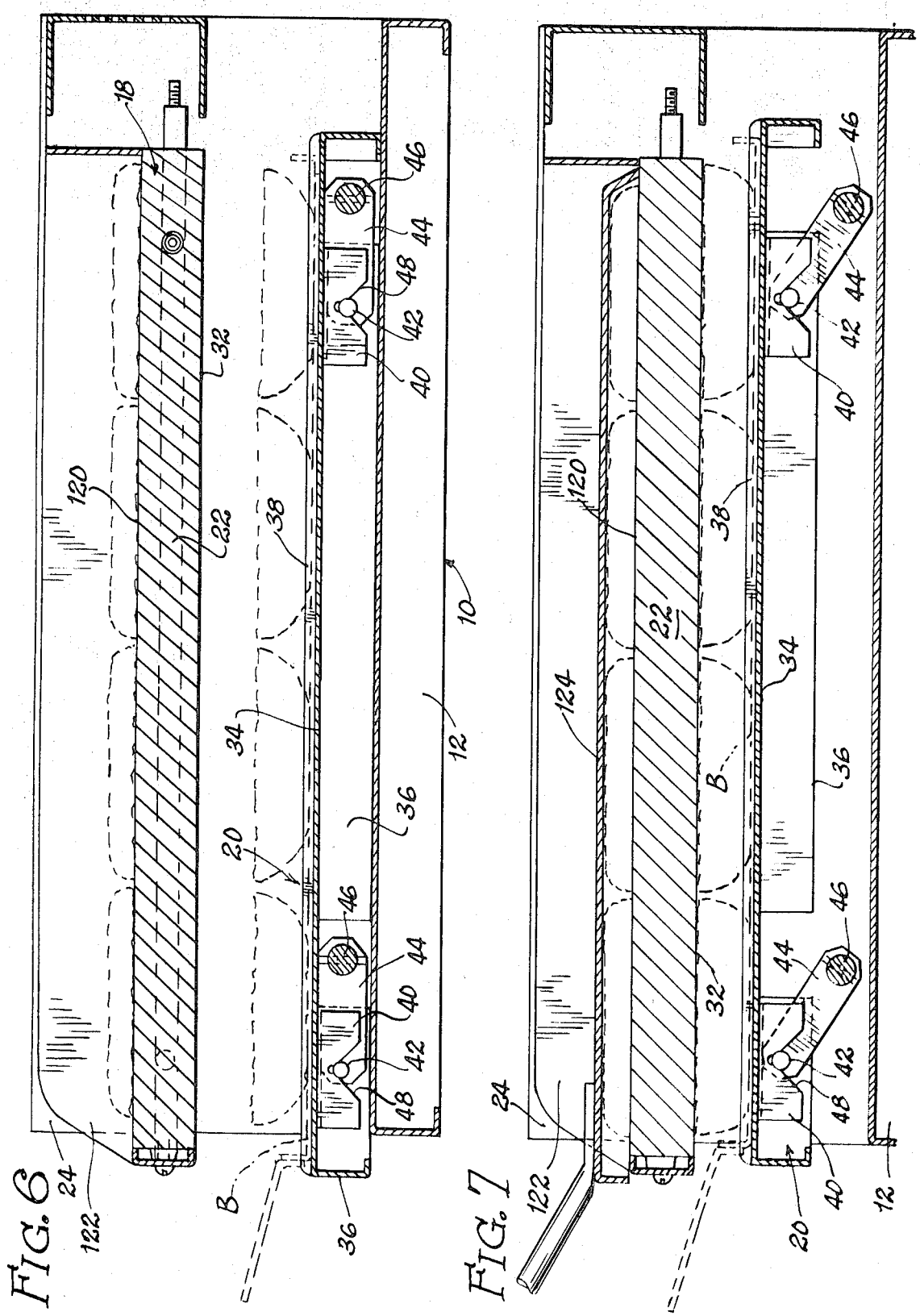

United States Patent Office 3,620,156
Patented Nov. 16, 1971

3,620,156
BUN TOASTER
James C. Schindler, Naperville, Ralph E. Weimer, Lombard, and Ronald M. Herbert, Hanover Park, Ill., assignors to McDonald's System, Inc.
Filed Nov. 3, 1969, Ser. No. 873,304
Int. Cl. A47j 37/68
U.S. Cl. 99—349                                      5 Claims

ABSTRACT OF THE DISCLOSURE

A toaster having a horizontal toasting platen and a parallel pressure face resiliently biasing an object to be toasted against the platen during a toasting cycle to compensate for normally encountered shrinkage of the object from the platen during a toasting cycle. A parallel linkage mounts the pressure face to provide movement perpendicular to the platen and some movement parallel to the platen to minimize sticking of the toasted object to the toasting platen.

---

This invention relates to a compact toaster especially adapted to toast bun sections used for making single deck and double deck sandwiches, such as hamburger sandwiches. Although it is especially useful for toasting bun sections, it is also adapted to toast other bakery goods as well.

Various devices are presently used to toast bun sections. Besides toasters of various types, a well known toasting expedient is a grill, such as one on which meat to be used in finished sandwiches is grilled. The use of such a grill for toasting requires substantial additional grill space, therefore making it necessary, in large volume restaurant operations, to devote substantial floor space for a grill for toasting. Besides that disadvantage, buns toasted on grills are not cleanly and uniformly toasted as they can be in a toaster.

Although there are a variety of toasters available for use in lieu of a grill, such toasters are largely either bulky or too slow for a high speed restaurant operation. Further, most of such toasters are not adapted to or readily adaptable to the handling of buns where the two or more bun sections are different in thickness, as heels and crowns usually are. Finally, those toasters which embody heated toasting platens usually fail to provide uniform toasting of the entire surface of a bun section because they tend to shrink away from the platen during toasting, thereby reducing surface contact between the platen and the bun surface to be toasted.

In accordance with this invention, a toaster adapted to toast a plurality of bun sections uniformly is provided. At least two toasting surfaces are provided, one above the other, whereby, for example, heels can be toasted on one surface and crowns, which are the most prone to nonuniform toasting, are toasted against the other surface. The toaster is compact and is preferably adapted to rest upon any available horizontal work surface, such as a table.

The toaster comprises a heated platen assembly and a parallel elevator which are proportioned to be relatively moved from a rest position to a less distantly spaced second position, which second position may be a preselected one of a range of second positions. They are then locked in a second position during a toasting cycle during which a resilient force is exerted, independent of gravity, to further compress bun sections positioned therebetween to maintain a generally uniform compressive force thereagainst during an entire toasting cycle. In that manner the normal tendency of the bun sections to shrink during toasting does not affect the toasting of the surface to be toasted and the bun sections are toasted to a uniform golden color quite consistently.

Preferably, the elevator is the member which is movable upwardly toward a platen assembly and it is mounted on a parallel linkage which imparts both a vertical and a slight relatively horizontal movement to the bun sections as they contact and are later withdrawn from the overlying toasting surface. This not only provides a highly desirable means for elevating and lowering the buns, but also tends to minimize sticking of the buns to the toasting surface because of the relative sliding movement of the buns with respect to the toasting surface which is imparted by the parallel linkage.

Not only are toasters of this invention adapted to the toasting of two-section buns, but in one embodiment such a toaster is particularly adapted to the toasting of three-section buns, those commonly used in the preparation of double deck sandwiches. In that embodiment a second platen assembly overlying a first platen assembly is provided. Preferably the second platen assembly is also mounted on a parallel linkage for movement toward and away from the first platen assembly, thereby to provide some generally parallel and sliding motion between confronting toasting surfaces after a toasting cycle is completed, thereby to minimize sticking to the toasting surfaces as has been described.

These and other objects, advantages and features of this invention will become apparent from the following description and drawings, of which:

FIG. 1 is a plan view, partially broken away and partially in section, of a toaster of a first embodiment of this invention;

FIG. 2 is a front view of the toaster of FIG. 1, partially in section and partially broken away;

FIG. 6 is a side sectional view taken substantially along the line 6—6 of FIG. 2;

FIG. 7 is a view similar to FIG. 6 with the toaster in a toasting position;

Figure 3:
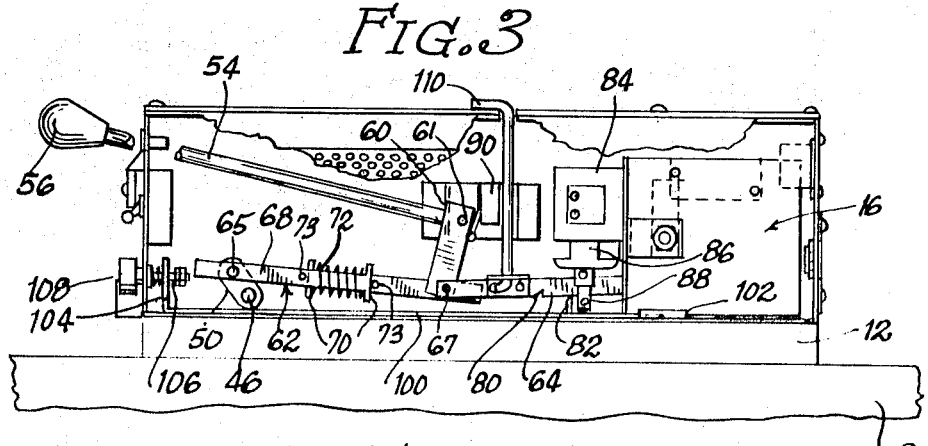
FIG. 3 is a side view of the toaster of FIG. 1, partially broken away, and as viewed from the right of FIG. 1.

Referring now to the toaster assembly T of FIGS. 1–7, inclusive, it is seen to comprise a frame 10 including a base 12 adapted to rest upon a horizontal surface, such as a table S, a left hand side section 14 and a right hand control housing 16. Frame 10 supports a toasting element and a pressure face adapted to contact opposite surfaces of an object, such as a bun section, to be toasted.

The toasting element comprises a horizontal platen assembly 18 dispersed between side section 14 and control housing 16 whereas the pressure face is provided by an elevator 20 which underlies platen assembly 18.

Platen assembly 18 comprises a toasting platen 22 and a fence or guard 24 which extends around the sides and back of platen 22 and which is secured to platen 22 in any suitable manner. Platen 22 is preferably a rectilinear plate having resistance elements embedded within it thereby to provide top and bottom toasting surfaces. Current for the resistance elements is provided via a conductor 30, which is plugged into the control housing 16 (see FIG. 1). A power source for the control housing is provided by conductor 31.

Platen assembly 18 is desirably removably mounted on frame 10. To that end, support pins 26 project laterally from the sides of the platen 22 and are slideably received in U-shaped channels 28 which project inwardly from side section 14 and control housing 16, respectively. When the platen assembly 18 is to be removed for cleaning, or the like, conductor 30 is disconnected from the control housing 16 and the entire platen assembly 18 is slid forwardly until the pins 26 are withdrawn from channels 28.

Elevator 20 is adapted to be moved toward and away from the lower surface 32 of platen 22 from a first lower position to one of a range of preselected second positions.

Elevator 20 comprises a horizontal pressure face on plate 34 having downwardly extending flanges defining a skirt 36 circumscribing its periphery. In the embodiment illustrated, three rearwardly projecting guide bars 38 are provided at the upper face. These guide bars effectively define a pair of compartments, each adapted to guide, accommodate and receive trays carrying objects to be toasted, such as bun sections or crowns. That is illustrated in FIG. 2. The bottom surface of plate 34 is provided with a plurality of clips 40, each of which is a generally U-shaped member, the central leg of which is connected, in any suitable manner, to the lower surface of plate 34. As seen in FIGS. 6 and 7, each of these clips defines a notch 48 adapted to accommodate and receive an elevator pin 42 and to straddle an associated support lever 44. Each pin 42 is mounted on a support lever 44. Each lever 44 in turn is co-rotatably mounted and fixed to a shaft 46. In the embodiment shown there are two shafts 46, one forwardly and one rearwardly, each extending between side section 14 and control housing 16. Each shaft is journaled for oscillation and rotation on the interior walls of side section 14 and control housing 16.

The depending legs of clips 40 which define the notch 48, straddle the associated support lever 44, thereby maintaining the plate 34 on the shafts 46 and preventing the clips from slipping off of pins 42. As stated, shafts 46 are mounted for oscillation about their axes on the frame. They are preferably co-oscillatably mounted, so that it is necessary to engage only one of the shafts directly to impart oscillatory movement to both of them. That is accomplished by providing a parallel linkage comprising a plurality of parallel links 50, a pair of which are co-rotably connected adjacent the ends of each shaft, and one of each pair being connected by a connecting link 52 to the other (see FIG. 5). Connecting link 52 is suitably journaled for oscillation with the connected parallel links 50 whereby movement of one of the parallel links connected thereto imparts movement to the other therethrough.

Figure 4:
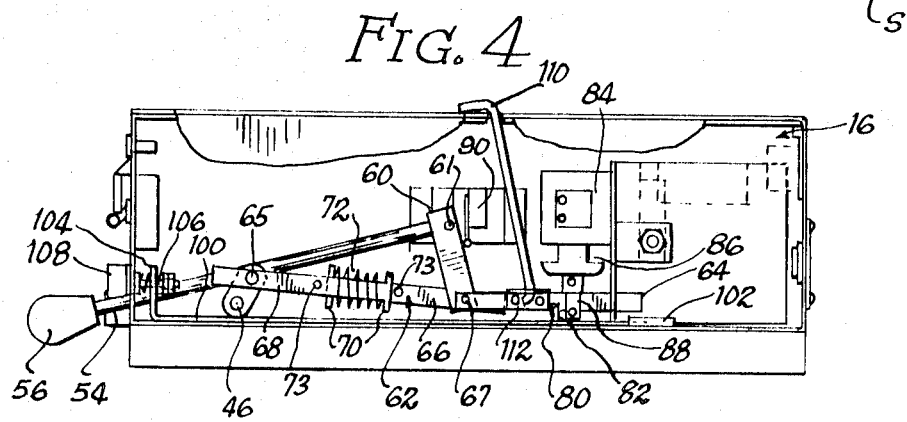
FIG. 4 is a view similar to FIG. 3, with the toaster in a toasting position.
Figure 5:
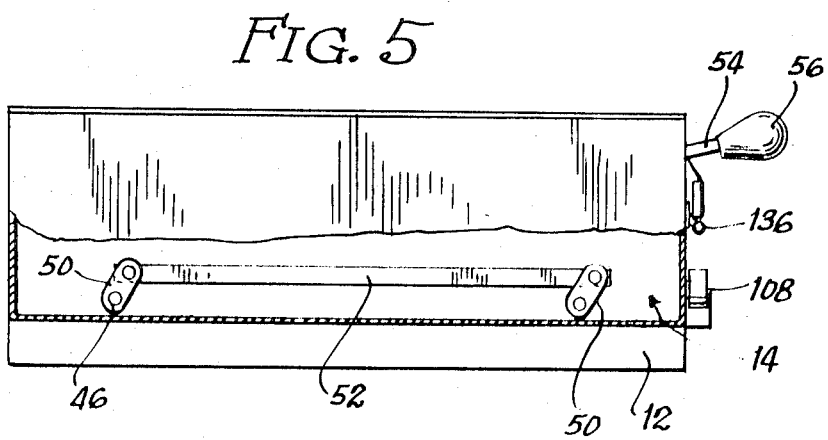
FIG. 5 is a side view, partially broken away, taken from the left of FIG. 1.
Figure 8:
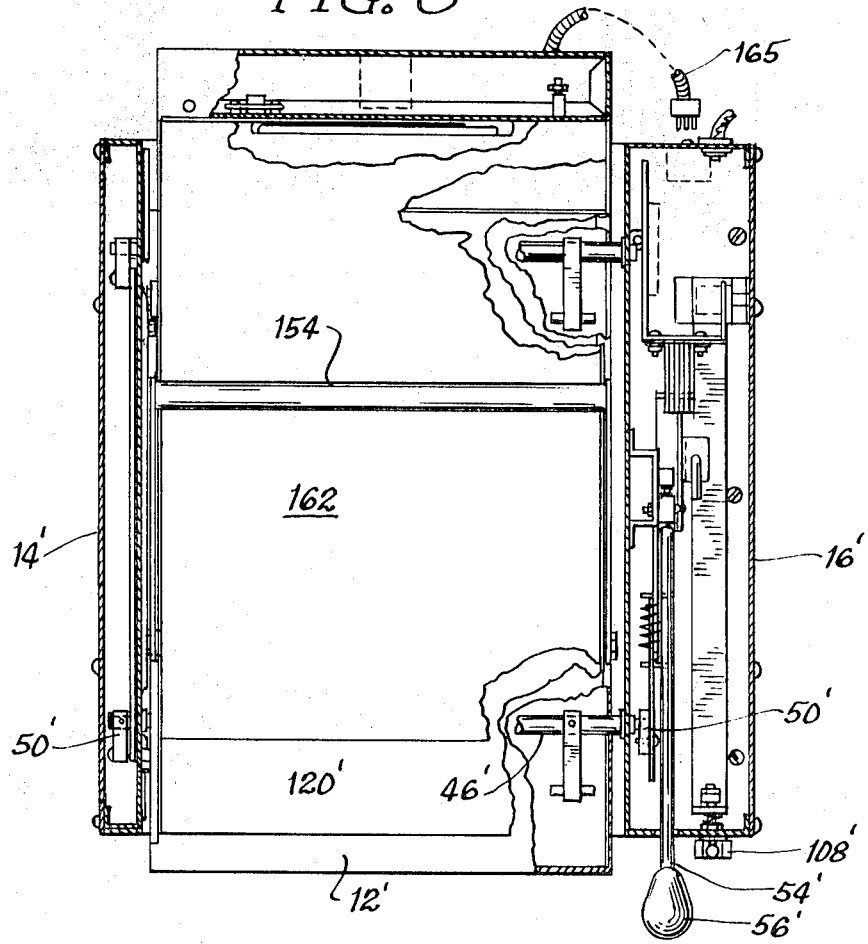
FIG. 8 is a plan view, partially broken away and partially in section, of a toaster of a second embodiment of this invention.
Figure 9:
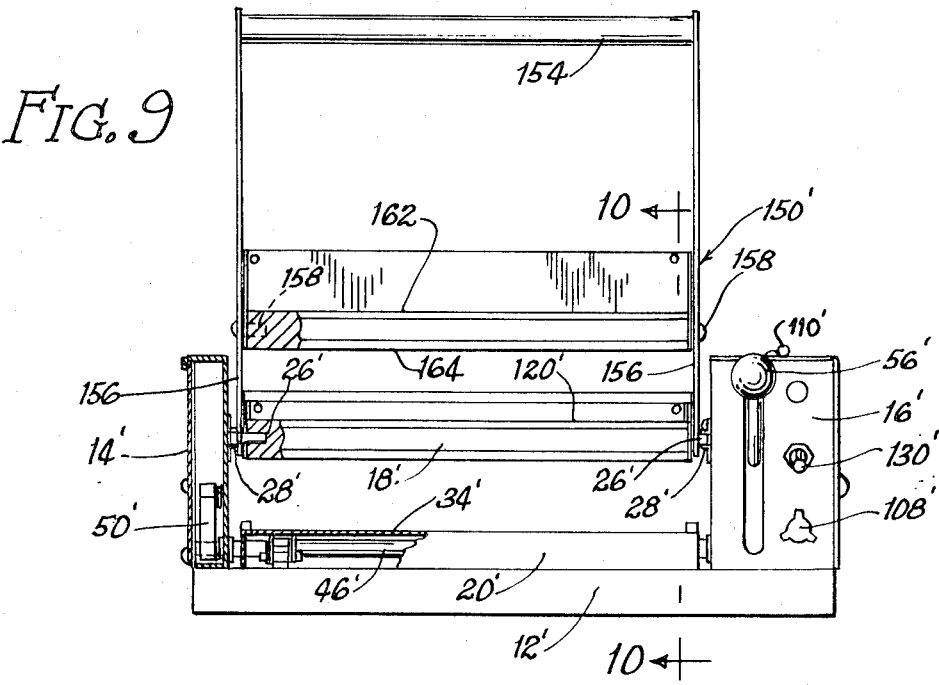
FIG. 9 is a front view of the toaster of FIG. 8, partially broken away and partially in section.

Referring now to FIGS. 3 and 4, parallel links 50 are moved via an actuator handle 54 which terminates outwardly in a suitable handle grip 56. As handle 54 is moved downwardly from the position illustrated in FIG. 3 to that of FIG. 4, it will be observed that the parallel link 50 shown is oscillated in a clockwise direction. The movement of parallel link 50 oscillates connected shaft 46 and the operatively connected other shaft 46 about their axes, and thereby, of course also oscillates the co-rotatably connected support levers 44. That serves to oscillate elevator pins 42 clockwise also (as viewed in FIGS. 3 and 4), thereby raising elevator 20 from the rest or first position illustrated in FIGS. 2 and 6 to a preselected raised position illustrated as in FIG. 7. It is in this manner that bun sections to be toasted against the lower surface 32 of platen 22 are brought into toasting engagement with surface 32.

The toaster of FIGS. 1 to 7 is adapted to continuously urge buns against surface 32 at a relatively uniform pressure. It has been found that as buns are toasted, they begin to shrink somewhat, so that if a resilient force of some type is not exerted between the buns and the surface against which they are to be toasted, non-uniform toasting occurs. It is therefore desirable to provide means for assuring continuous contact between the buns to be toasted and the toasting surface, and at a relatively uniform pressure. Means for resiliently urging the buns against toasting surface 32 independently of gravity force will now be described.

Actuating handle 54 is connected at the end remote from grip 56 to an actuator lever 60. Actuator lever 60 is pivotally journaled at its upper end on a bracket connected to control housing 16. Therefore lever 60 moves at its upper end about a fixed pivot 61. At its lower end, actuator lever 60 is pivotally connected to a spring lever assembly 62 and a release lever 64. Spring lever assembly 62 is pivotally mounted at the end remote from actuator lever 60 to a parallel link 50, i.e., at pivot 65. Thus, as spring lever assembly 62 is moved from the position shown in FIG. 3 to that shown in FIG. 4 by actuator lever 60, it causes parallel link 50, hence shafts 46, to move in the manner previously described.

Spring lever assembly 62 comprises a pair of arms and a spring. A first arm 66 is pivotally connected at pivot 67 to actuator lever 60 and projects forwardly therefrom. A second arm 68 is pivotally connected at pivot 65 to the parallel link 50 and extends rearwardly toward actuator lever 60. As seen in FIG. 1, arms 66 and 68 lie side by side for a portion of their respective lengths. Each arm mounts an integral terminal stop segment 70 between which a compression spring 72 is positioned. Spring 72 acts against segments 70 and surrounds the side by side portions of arms 66 and 68 thereby to maintain their side by side and longitudinally aligned relationship. Roll pins 73 limit the movement of segments 70 outwardly. Because the arms are otherwise unrestrained, it will be apparent that the effect of the compression spring is to tend to reduce the effective length of the lever assembly 62, i.e., to reduce the distance between pivots 65 and 67. That then tends to further oscillate shafts 46, thereby further raising elevator 20. The further oscillation of shafts 46 via the resilient loading of elevator 20 by spring 72 insures the maintenance of a relatively uniform pressure between toasting surface 32 and the buns being toasted thereagainst, even though the buns otherwise would tend to shrink away from surface 32 during toasting.

To provide the resilient loading force described it is necessary to lock the elevator 20 in a preselected upper position. That is accomplished via release lever 64. Lever 64 defines a notch 80 intermediate its ends. Notch 80 is adapted to receive a latch 82. Release lever 64 is freely pivotally mounted at pivot 67 and is adapted to ride on and traverse latch 82 until latch 82 enters notch 80, i.e., from the position of FIG. 3 to that of FIG. 4. Latch 82 when positioned in notch 80 as seen in FIG. 4 prevents the return of the actuating handle 54 and the associated elevating mechanism from the position shown in FIG. 4 to that shown in FIG. 3. It thereby serves to fix release lever 64 in the position shown in FIG. 4 and to fix actuating lever 60 in the position there shown so that the compression spring can act to reduce the effective length of the spring lever assembly in the manner described. Means are also provided for unlocking latch 82 and notch 80 by oscillating release lever 64 upwardly with respect to pivot 67, thereby freeing actuating lever 60 and elevator 20 for return to the position shown in FIG. 3.

The means for so unlocking release lever 64 comprises a solenoid 84 including an armature 86 connected to a latch release 88. Latch release 88 slideably receives release lever 64 and underlies it as well. The normal position of the armature 86 and the associated latch release 88 are those illustrated in FIGS. 3 and 4. However, when the coil of solenoid 84 is energized, it lifts armature 86 and connected latch release 88, and the portion of latch release 88 underlying release lever 64 lifts the release lever thereby disengaging the latch 82 from the notch 80 and returning actuator lever 60 and the associated moving mechanism to the position of FIG. 3.

Preferably, the operation of the toaster assembly herein described is automatic. That is to say, that when the actuator handle 54 is moved from the position shown in FIG. 3 to that shown in FIG. 4, a microswitch 90 starts a timer (not shown). When a preset time cycle has been completed, the timer energized solenoid 84 through suitable circuitry, thereby to release release lever 64 from its engagement with latch 82.

In addition to providing automatic compensation for shrinkage of the bun to be toasted, thereby maintaining uniform toasting pressure throughout an automatically timed toasting cycle, means are provided for making major adjustments in the spacing between the elevator and the toasting surface to accommodate major differences in the thickness of buns to be toasted. To that end, latch 82 is mounted on an adjustable latch arm 100, thereby to permit movement of the latch 82 to the right and left as viewed in FIGS. 3 and 4. One end of the latch arm 100 is positioned in a formed guide slot 102 and the other end is provided with a vertical flange 104. Flange 104 defines a threaded opening for threadedly receiving a complementary bolt 106. Bolt 106 is secured to a suitable knob 108 which is journaled on the front of control housing 16. Thus, by rotating knob 108, arm 100 is moved to the right or to the left, as the case may be, thereby also moving connected latch 82. By moving latch 82 to the right as viewed in FIGS. 3 and 4, it will be apparent that for it to engage notch 80, release lever 64 must be moved to the right a greater distance. This results in a greater amount of oscillation of shaft 46, thereby effectively reducing the distance between elevator 20 and the lower surface 32 of the platen before they are locked into a preselected position for toasting. Of course, if the latch is moved to the left, a greater spacing will be provided between the elevator and surface 32. The spacing should be such that when the elevator is moved to the position of FIG. 4 the spring 72 is partially compressed to provide the biasing force during the toasting cycle. A desirable range of distances within which to provide for adjustment of the spacing between the elevator and the platen assembly is from about one-half inch to one inch. From this range a variety of second or toasting positions are preselectable.

If for some reason, one wishes to interrupt an automatically timed toasting cycle before its completion, manual release means are provided. Referring especially to FIGS. 3 and 4, it will be observed that a release rod 110 is connected to a bracket 112, which bracket is secured to release lever 64. To disengage interlocked notch 80 and latch 82, one needs only to pull up on release rod 110 and the connected bracket 112 will raise release member 64 sufficiently to retract the notch 80 from latch 82.

The bun toaster of FIGS. 1 to 7 is also adapted to toast on the other side of platen 22, i.e., surface 120. Surface 120 is circumscribed by the fence or guard 24 and in the embodiment illustrated also is provided with a central divider 122. Each of the compartments thus defined between guard 24 and divider 122 is adapted to receive a plurality of bun sections, such as bun heels, which bun sections are adapted to be biased against surface 120, as by a separate cover plate 124.

To utilize the toaster assembly of FIGS. 1 to 7, bun crowns are placed face up on a separate suitable spatula or bun tray B and are inserted as illustrated in FIG. 6. The bun tray may be left in that position because it will not interfere with the toasting. Handle 54 is then moved from the position shown in FIG. 3 to that shown in FIG. 4 to begin an automatically timed toasting cycle. Bun heels are positioned face down on the upper surface 120 of the platen and the cover plate is positioned over them to urge them into contact with the surface. After the toasting cycle is completed, i.e., elevator 20 automatically returns to the position of rest or lower position, the crowns are removed for use. The heels are removed as by a suitable spatula.

Means (not shown) are provided for adjusting the toasting period, within a suitable range, as from 2 minutes to 3 minutes, and, of course, as the dimension of the crowns to be toasted against surface 32 changes, an adjustment of the position of the latch 82 may be indicated which is accomplished via knob 108. In addition to knob 108, the front of control housing 16 may carrying suitable means for adjusting the timing of a toasting cycle and an on-off switch 130.

Referring now to FIGS. 8 to 11 inclusive, a second embodiment of this invention is there shown. It is largely the same as the embodiment of FIGS. 1 to 7 except that it is adapted to toast three tiers of bun sections simultaneously rather than only two section. It is therefore especially useful in connection with the preparation of three-deck sandwiches, and especially those in which the three sections are cut from a single bun in a known manner.

In the connection, the elevator 20', its operating mechanism and control, and its mode of movement with respect to platen assembly 18' are substantially identical to those of the embodiment of FIGS. 1 to 7 except that only one, rather than two side-by-side, toasting compartments are provided. Like parts are designated by the same numerals used in connection with FIGS. 1 to 7 except that they bear a "prime" designation. The platen assembly 18' is also largely the same in construction as that of FIGS. 1 to 7 except that it is adapted to cooperate with and to support a second platen assembly.

Figure 10:
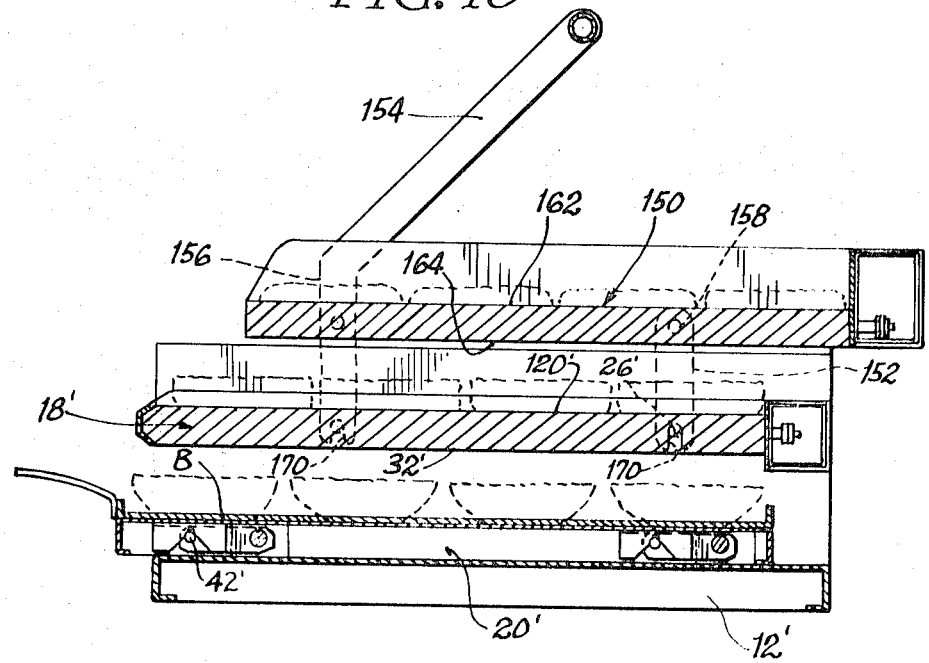
FIG. 10 is a sectional view of the toaster of FIG. 9, taken substantially along line 10—10 of FIG. 9.
Figure 11:
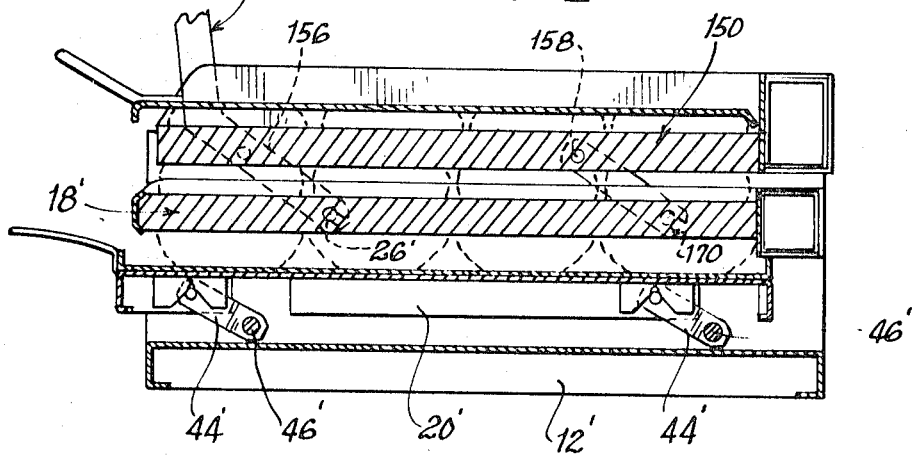
FIG. 11 is a view similar to FIG. 10 with the toaster in a toasting position.

Referring now especially to FIGS. 10 and 11, platen assembly 18' is provided with two pairs of support pins 26' which are slideably mountable in a pair of channels 28' on the toaster frame. In addition to supporting the platen assembly 18' they also oscillatably support second platen assembly 150 via a parallel linkage, including a pair of links 152 (only one of which is shown in FIG. 10) and a handle 154 terminating at its lower ends in a pair of link sections 156 (only one of which is shown in FIG. 10). The upper ends of links 152 and link sections 156 are pivotally mounted on pins 158, which pins are connected to and project from the sides of the second platen assembly 150. This link and pin system provides the parallel linkage which permits movement of platen assembly 150 from the open position shown in FIG. 10 to the closed position illustrated in FIG. 11.

The second platen assembly 150 comprises a platen having resistance heater means embedded therein which is adapted to heat both surfaces 162 and 164 to toasting temperature. The resistance heater is suitably connected to a conductor 165 which is also adapted to be plugged into control housing 16 to provide a power source for the heater. After bun sections, such as middle sections to be toasted on both sides, are positioned between lower surface 164 and upper surface 120' of the first platen assembly, the handle 154 is moved forwardly from the position shown in FIG. 10 to that shown in FIG. 11. It will be clear that the weight of the second platen assembly serves to exert a compressive force against the buns positioned between surfaces 120' and 164 to maintain contact between the bun surfaces and the toasting surfaces. It will also be apparent that the parallel linkage imparts both a vertical component of motion, and a parallel component of motion to surface 164 with respect to surface 120' thereby to minimize sticking of the bun sections to the platens when the surface 164 is returned to the position of FIG. 10.

It will be clear that each of the links 152 and link sections 156 defines a U-shaped notch 170 to receive the support pins 26'. This both maintains engagement between the second platen assembly and the pins 26' and makes it possible, when it is desired, to clean the platen assemblies to remove the entire second platen assembly simply by lifting it from the support pins. Thereafter, the first platen assembly may be removed in the manner previously described.

The bun sections to be toasted on the upper surface 162 of the second platen assembly and against the lower surface the first platen assembly are positioned, toasted and removed in the manner previously described with respect to the first embodiment.

Preferably the surfaces of the toasting platens are coated with a non-stick coating, such as high temperature resistant polytetrafluoroethylene. Desirably all surfaces of the toasting assemblies of this invention which are exposed to the buns or which must be cleaned periodically are formed of stainless steel. Although buns and bun sections have been referred to herein, such descriptions are intended to be descriptive only since it will be apparent that the toaster of this invention is adapted to toast other bakery goods as well.

What is claimed is:

1. A toaster comprising a frame, a horizontally oriented toasting platen and a movable pressure face parallel thereto and spaced therefrom, each mounted on said frame, means for moving said pressure face from a first position toward a preselected one of a range of second positions closer to said platen, said means including a parallel linkage mounted on said frame and operatively connected to said pressure face for imparting both vertical and parallel movement of said pressure face with respect to said toasting platen, and means for locking said moving means in a preselected one of said second positions.

2. In the toaster of claim 1 wherein said frame mounts a second toasting platen on the side of said first platen opposite from said pressure plate and said second toasting platen is supported on a second parallel linkage for movement toward and away from said first toasting platen.

3. In the toaster of claim 1 in which said moving means includes means for biasing said pressure face from a preselected second position toward said toasting platen automatically to maintain a generally uniform pressure against an object interposed therebetween during a toasting cycle.

4. In a toaster, a frame, a horizontal toasting element adapted to contact a first surface of an object to be toasted, a horizontal pressure face confronting said toasting element and spaced therefrom and adapted to contact a second surface of an object to be toasted, means for moving said pressure face from a first position spaced away from said toasting element to one of a plurality of second positions closer to said toasting element, means independent of gravity for urging said pressure face toward said toasting element to vary the spacing therebetween during toasting to maintain a substantially uniform force greater than a gravity loaded force against the first and second surfaces of said object during toasting, said urging means being operatively connected to said moving means and being operative to maintain said force after said moving means has moved said pressure face to said one of said second positions, adjustment means for preselecting one of said plurality of second positions, and locking means for locking said moving means in each of said preselected second positions against movement of said pressure face toward said first position.

5. In the toaster of claim 4, wherein said moving means includes a parallel linkage mounted on said frame and operatively connected to said pressure face for imparting both vertical and parallel movement of said pressure face with respect to said toasting element, thereby to minimize sticking to said toasting element.

References Cited

UNITED STATES PATENTS

| 1,758,121 | 5/1930 | Lines | 99—379 |
| 1,839,112 | 12/1931 | Mills | 99—375 |
| 1,856,864 | 5/1932 | Claus | 99—379 |
| 1,859,004 | 5/1932 | Reich | 99—379 |
| 1,952,763 | 3/1934 | Lux | 99—335 UX |
| 2,108,778 | 2/1938 | Morgan | 99—374 |
| 3,483,813 | 12/1969 | Noel | 99—423 X |

BILLY J. WILHITE, Primary Examiner

U.S. Cl. X.R.

99—335, 379, 390, 393, 423, 448